US006614818B1

(12) United States Patent
Kmetec et al.

(10) Patent No.: US 6,614,818 B1
(45) Date of Patent: Sep. 2, 2003

(54) MODE-HOP-FREE SINGLE FREQUENCY SOLID STATE LASER

(75) Inventors: Jeffrey D. Kmetec, Palo Alto, CA (US); Mark A. Arbore, Palo Alto, CA (US); Manuel Martinez, Sunnyvale, CA (US)

(73) Assignee: Lightwave Electronics, Mountain View, CA (US)

( * ) Notice: Subject to any disclaimer, the term of this patent is extended or adjusted under 35 U.S.C. 154(b) by 0 days.

(21) Appl. No.: 09/452,938

(22) Filed: Dec. 1, 1999

(51) Int. Cl.$^7$ .............. H01S 3/098; H01S 3/08; H01S 5/065
(52) U.S. Cl. .............. 372/19; 372/20; 372/68; 372/107
(58) Field of Search .............. 372/36, 107, 20, 372/19, 68

(56) References Cited

U.S. PATENT DOCUMENTS

| | | | | | |
|---|---|---|---|---|---|
| 3,628,044 | A | * | 12/1971 | Young | 359/328 |
| 3,987,373 | A | * | 10/1976 | Mohler | 372/34 |
| 4,583,227 | A | | 4/1986 | Kirkby | 372/32 |
| 4,749,842 | A | * | 6/1988 | Kane | 219/201 |
| 4,785,459 | A | * | 11/1988 | Baer | 372/75 |
| 4,797,893 | A | * | 1/1989 | Dixon | 372/66 |
| 4,912,715 | A | * | 3/1990 | Aoki | 372/36 |
| 5,144,632 | A | | 9/1992 | Thonn | 372/33 |
| 5,170,409 | A | * | 12/1992 | Nightingale | 372/107 |
| 5,390,211 | A | * | 2/1995 | Clark | 372/95 |
| 5,870,417 | A | | 2/1999 | Verdiell et al. | 372/32 |
| 5,914,972 | A | * | 6/1999 | Siala | 372/33 |
| 5,940,420 | A | * | 8/1999 | Blair | 372/35 |

* cited by examiner

Primary Examiner—Paul Ip
Assistant Examiner—Jeffrey Zahn
(74) Attorney, Agent, or Firm—Lumen Intellectual Property Services, Inc.

(57) ABSTRACT

An optical resonator has an axial mode frequency tuning rate with respect to temperature matching the peak gain frequency tuning rate, so that mode hops are eliminated. The resonator contains a composite cavity consisting of a gain medium and free space. Preferably, the resonator is a single-frequency solid state laser containing a solid state gain medium defining a physical path length $L_g$. The optical cavity is defined by a high reflector and output coupler surrounding the gain medium and defining a physical cavity path length $L_o$. The high reflector and output coupler are mounted on a substrate so that $L_o$ is temperature insensitive. Preferably, the substrate is a thermally insensitive material having a negligible coefficient of thermal expansion; for example, it may be Invar™, Super-Invar™, ULE™ Glass, Zerodur™, and fused silica. Alternately, the substrate is a thermally isolated material that is temperature controlled and insulated from the gain medium. When $L_o = L_g$, the axial mode tuning rate has a greater magnitude than the peak gain tuning rate. However, $L_o/L_g$ is fixed and designed so that the axial mode tuning rate is identical to the peak gain tuning rate. In particular, $$\frac{L_o}{L_g} = 1 - n_g - \nu_m \left[ \frac{(n_g - 1)\frac{1}{L_g}\frac{dL_g}{dT} + \frac{dn_g}{dT}}{\frac{d\nu_g}{dT}} \right].$$

The laser preferably contains means for ensuring single-frequency operation. For a ring laser, it may include a magnet and half-wave plate inside the cavity, coupled with rod-shaped gain material with anti-parallel Brewster facets. For a non-planar ring oscillator, the purpose of the half-wave plate is instead served by the non-planar path. Alternately, the resonator is an optical parametric oscillator.

32 Claims, 5 Drawing Sheets

$L_f = L_{f1} + L_{f2} + L_{f3} + L_{f4} \quad L_o = L_f + L_g$
$L_g = L_{g1} + L_{g2}$ $L_f = L_{f1} + L_{f2} + L_{f3} + L_{f4}$    $L_o = L_f + L_g$
$L_g = L_{g1} + L_{g2}$

MODE-HOP-FREE SINGLE FREQUENCY SOLID STATE LASER

FIELD OF THE INVENTION

This invention relates generally to single-frequency solid state lasers. More particularly, it relates to lasers in which frequency tuning with temperature occurs without mode hops.

BACKGROUND ART

Single-frequency solid state lasers find many applications in coherent communications, laser radars, and as pump lasers for nonlinear optical frequency conversion, among other applications. The frequency of operation of the laser depends on two important features. First, the solid state gain medium has a characteristic frequency response, generating light in a particular continuous frequency range by stimulated emission in response to pumping, often by laser diodes. Second, the laser cavity has a particular total optical path length (product of physical path length and index of refraction) that determines the allowed discrete wavelengths of axial modes—only an integral or half-integral number of wavelengths is allowed. The gain frequency range is a continuous curve, often a Lorentzian distribution, within which many axial modes are allowed. FIG. 1 illustrates a typical gain envelope supporting many possible axial modes. The spacing of axial modes, known as the "free spectral range" is inversely proportional to cavity length. In general, only the axial modes near the peak gain wavelength can support lasing.

Various techniques have been developed to ensure single-frequency laser operation. The simplest is to use a very small cavity, which provides a large axial mode spacing, and therefore limits the number of modes that will fit under the gain envelope. In general, these monolithic resonators, in which the cavity is defined by the physical boundaries of the crystal itself, exhibit many problems, including poor pump absorption and exclusion of intracavity tuning elements. They also exhibit significant spatial hole burning, a phenomenon caused by overlap of two portions (or directions) of the beam path in the gain medium. The standing-wave patterns resulting from interference of the beams, when only one axial mode oscillates, gives rise to incomplete gain saturation at the nodes. These low-saturation regions exhibit higher gain than the rest of the laser material and preferentially overlap with the standing wave pattern for adjacent axial modes of the resonator, leading to oscillation of two or more modes at once. In response to these problems, birefringent tuning filters and coupled cavity designs are used to provide frequency-dependent loss for mode discrimination over a wide gain bandwidth. These solutions tend to be very lossy and complex. Twisted mode resonators induce circular polarization, eliminating spatial hole burning. Ring cavities eliminate counter-propagating beams altogether using frequency-selective elements to force unidirectional oscillation.

Even when single frequency operation is attainable using one of the above methods, the problem of axial mode hopping is still present. This phenomenon can be understood by considering the graph of FIG. 1. The shape and horizontal position of the gain curve 10 is a function of temperature. In particular, the peak gain $\upsilon_g$ has a particular peak gain frequency tuning rate with respect to temperature ($d\upsilon_g/dT$), which is usually negative (i.e. increased temperature leads to a decreased frequency). Each axial mode 12 also has a particular tuning rate with respect to temperature, which depends on the optical path length, and therefore on the thermal expansion coefficient and thermo-optic coefficient (refractive index rate of change with temperature) of the cavity elements. In a monolithic laser, in which the entire cavity is defined by the crystal with polished edges, the cavity optical path length is determined solely by properties of the lasing material. These two temperature responses (i.e., peak gain and axial mode) are completely physically independent. In general, the two tuning rates are unequal, with the axial mode tuning rate usually greater for solid state monolithic lasers. As the temperature of the gain medium is increased, the axial mode frequency $\upsilon_m$ nearest to the peak decreases more quickly than the peak gain frequency $\upsilon_g$, and eventually a different axial mode 12 at a higher frequency will be closer to the peak gain. As a result, the laser will "hop" over to that higher frequency mode.

This behavior is illustrated in FIG. 2, a graph of axial mode photon energy versus crystal temperature for a monolithic Nd:YAG laser, a common solid state laser. The peak gain temperature shift is given by the overall slope of the curve 20, while the piece-wise slope is the tuning rate of the axial mode. The discontinuities in the curve are the mode hops, which occur approximately every 4–5 ° C. for a 20 mm long cavity. Obviously, these mode hops are unacceptable for stable laser operation. Since the mode hops illustrated in the curve of FIG. 2 are reproducible, it is possible to operate a laser at a temperature away from the discontinuities. Often, however, it is either impossible or undesirable to maintain the crystal temperature within such a small temperature range.

The problem of eliminating mode hops has not been solved satisfactorily in solid state lasers. However, it has been addressed with some success in other types of lasers with very different operating conditions. A laser with an actively stabilized etalon for frequency selection is disclosed in U.S. Pat. No. 5,144,632, issued to Thonn. A parameter indicative of the laser's output frequency, either output power or current supplied, is monitored, and the etalon temperature is varied to maintain operation at a desired frequency. This solution has two significant drawbacks that make it unsuitable: it requires a complicated feedback system for frequency stabilization, and it does not really address the problem of mode hops. Rather, it maintains a fixed frequency, keeping operation away from regions in which mode hops occur.

The problem of mode hopping has also been addressed in semiconductor lasers, which have much different operating conditions than solid state lasers. A waveguide DBR laser containing a semiconductor gain element and a waveguide grating functioning as a resonant cavity end reflector is disclosed in U.S. Pat. No. 5,870,417, issued to Verdiell et al. Various methods of suppressing mode hops are addressed in this device. Minimizing the length of the optical cavity increases the free spectral range, making it less likely for mode hops to occur within a relatively narrow temperature range. The device is also designed with particular lengths and thermal conductivities of substrate material so that the optical path length remains constant with an increase in temperature. As the gain element increases in size with increasing temperature, the end reflector moves closer toward the gain element to maintain a constant optical path length. As a result, the mode frequency remains relatively constant and therefore near the peak gain frequency, which has a tuning rate with a lower magnitude. A third solution is to maintain the entire device at a constant temperature, so that the operation frequency is fixed, and the tuning rates become irrelevant. The device can also be maintained at a temperature between mode hops, but not necessarily at a single exact temperature. Note that these solutions prevent the laser from having a useful tuning range. Other methods include changing the refractive index of the gain medium by current pumping in response to temperature changes of the device. These methods require a very uniform and constant temperature throughout the device. Either the temperature is controlled to be within a very narrow range, or the temperature is assumed to remain within a narrow range. Maintaining a constant optical path length ensures that the axial modes do not shift with temperature. Mode hopping is prevented only if the peak gain frequency also remains virtually constant. As discussed below, maintaining a narrow temperature is unsuitable for solid state laser operation.

The problem of mode hopping in semiconductor lasers is also addressed in U.S. Pat. No. 4,583,227, issued to Kirkby et al. The device is constructed with a semiconductor gain element and an external reflector located at a known distance from the gain element and mounted on a support that shifts with temperature. The support structure is chosen to have a particular size and thermal expansion coefficient so that its response to temperature fluctuations is predetermined. Four different embodiments are disclosed: two in which the semiconductor face opposite the reflector is partially reflective, and two in which the face has an anti-reflective coating. In the latter two embodiments, the support structure moves with temperature either to maintain a constant composite cavity optical path length, as was done in the device of Verdiell et al., or to provide a composite cavity thermal expansion coefficient that is equal to the peak gain wavelength expansion coefficient. In the first of these options, the device must still be operated in a narrow temperature range, so that the peak gain wavelength remains virtually constant. In the second case, which does not require such a narrow temperature range, a thermal expansion coefficient that is not physically realizable is required. The required coefficient is much larger than that of existing materials, and is achieved only by a complicated structure of layered supports of varying thermal expansion coefficients. This complicated solution derived by Kirkby et al. is not applicable to solid state lasers. In semiconductor lasers, the axial mode tuning rate is usually greater than the peak gain tuning rate, while in solid state lasers, the peak gain tuning rate is greater than the axial mode tuning rate. This puts completely different design requirements on solutions for avoiding mode hops in the two types of lasers. The method Kirkby et al. teach for matching the two frequency tuning rates is based on proper choice of the expansion coefficient of the substrate. The entire cavity must therefore expand at a known rate.

In fact, none of these various semiconductor laser solutions can be applied to solid state lasers to achieve the desired mode-hope-free operation. Most of the solutions deal only with stabilizing the composite cavity path length and therefore axial mode, and are only suitable for a narrow temperature range in which the peak gain remains relatively constant. More importantly, however, semiconductor lasers and solid state lasers have significantly different operating conditions, and even the final solution of Kirbkby et al., equating the cavity expansion to the peak gain wavelength expansion, is unsuitable. This method requires that the entire laser cavity, including gain medium, supports, and external reflector, be at a uniform temperature, even as the temperature changes. While this requirement is achievable in low power, single frequency semiconductor lasers, it is virtually impossible to achieve in solid state lasers. Solid state laser materials generate significant waste heat, on the order of Watts or tens of Watts, while semiconductor materials generate only milli-Watts of waste heat. Waste heat is localized within the solid state gain material, and it is virtually impossible to keep the rest of the laser cavity at the same temperature. Waste heat generation also fluctuates throughout the gain material itself, causing fluctuations in the temperature of the gain material but not in the temperature of the remainder of the cavity. These temperature fluctuations are often so large that it is not feasible to keep the laser operating between mode hops. Furthermore, semiconductor lasers have cavity lengths on the order of 300 $\mu$m, providing for large free spectral ranges of many GHz, while solid state lasers have much smaller free spectral ranges, down to hundreds of MHz. These small free spectral ranges require much tighter axial mode control, not achievable with the solutions listed above.

There is still a need for a solid state laser in which mode hops are prevented over a large temperature tuning range and without need for complicated temperature control and feedback systems.

OBJECTS AND ADVANTAGES

Accordingly, it is a primary object of the present invention to provide a solid state laser that is tunable over a wide temperature and frequency range without mode hops.

It is a further object of the invention to provide a simple design for a mode-hop-free solid state laser that can be applied to a wide range of solid state gain materials.

It is an additional object of the invention to provide a mode-hop-free laser design that can be applied to all types of single-frequency solid state lasers, including standing wave, ring, and non-planar ring oscillators.

It is another object of the present invention to provide a mode-hop free laser in which preventing mode hops is inherent in the laser design, and requires no active feedback control mechanism.

It is an additional object of the present invention to provide a mode-hop free laser that does not require a uniform cavity temperature in order to prevent mode hops.

Finally, it is an object of the present invention to provide an optical parametric oscillator that is tunable over a wide temperature and frequency range without mode hops.

SUMMARY

These objects and advantages are attained by a single-frequency optical resonator in which mode hops are prevented over a wide range of temperatures and frequencies by the inherent design of the resonator. The resonator has a composite cavity with a length chosen so that the peak gain frequency tuning rate matches the axial mode frequency tuning rate, thereby assuring that mode hops are prevented as the temperature shifts. In one embodiment, the resonator is solid state laser. The laser contains a solid state gain medium defining a physical gain path length $L_g$, a pump adjacent to the gain medium, a substrate, a high reflector, and an optical coupler. The high reflector and optical coupler are supported by the substrate and define a resonant cavity that surrounds the gain medium and has a round-trip physical cavity path length $L_o$.

The gain medium generates light of a characteristic frequency spectrum with a peak gain frequency $\upsilon_g$ and a peak gain frequency tuning rate with respect to temperature $d\upsilon_g/dT$. It also has a refractive index $n_g$, a thermo-optic coefficient $dn_g/dT$, and a thermal expansion coefficient $(1/L_g) \, dL_g/dT$. Preferably, the gain medium generates waste heat at a rate of greater than 1 W; waste heat dissipation is confined to a region substantially near the gain medium. Suitable gain media include Nd:YAG, Nd:YVO$_4$, Nd:YLiF$_4$, Tm:YAG, Tm: YLiF$_4$, Yb:YAG, Nd:glass, Ho: YLiF$_4$, and Er:glass. Nd:YAG may be operated at both $\upsilon_g$=2.818×10$^5$ GHz (i.e. $\lambda$=1.064 $\mu$m), in which case the peak gain frequency tuning rate $d\upsilon_g/dT$=−1.3 GHz/° C., or at $\upsilon_g$=2.273×10$^5$ GHz ($\lambda$=1.319 $\mu$m), with a peak gain frequency tuning rate $d\upsilon_g/dT$=−1.0 GHz/° C.

The substrate is such that the cavity physical path length is temperature insensitive. Preferably, the substrate is thermally insensitive, having a negligible thermal expansion coefficient. For example, it may be Invar™, Super-Invar™, ULE™ Glass, Zerodur™, or fused silica. Alternately, it is thermally isolated: the substrate material is maintained at a constant temperature and is thermally insulated from the gain medium. The cavity supports lasing at a range of axial mode frequencies but operates at a specific axial mode frequency $\upsilon_m$ closest to $\upsilon_g$. When $L_o$=$L_g$, the axial mode tuning rate has a greater magnitude than the peak gain frequency tuning rate, i.e, $|d\upsilon_m/dT|>|d\upsilon_g/dT|$. However, $L_o/L_g$ is chosen so that the axial mode tuning rate $d\upsilon_m/dT$ is substantially equal to the peak gain frequency tuning rate $d\upsilon_g/dT$. This ensures that axial mode frequency tuning occurs without axial mode hopping, preferably with the gain medium at a temperature between −20 ° C. and 80 ° C. In particular, $$\frac{L_o}{L_g} = 1 - n_g - \nu_m \left[ \frac{(n_g-1)\frac{1}{L_g}\frac{dL_g}{dT} + \frac{dn_g}{dT}}{\frac{d\nu_g}{dT}} \right].$$

For an Nd:YAG gain medium, $L_o/L_g$=2.11 at $\lambda$=1.064 $\mu$m and $L_o/L_g$=2.25 at $\lambda$=1.319 $\mu$m.

The laser preferably contains other standard elements for ensuring single frequency operation. Preferably, the laser is a ring oscillator, in which case it has means for ensuring unidirectional lasing, but it may also be a standing wave laser. For a ring oscillator, the gain medium is two cylindrical rods, each of which has two antiparallel Brewster face. The laser also contains a magnet adjacent to the gain medium to provide non-reciprocal polarization rotation. Reciprocal polarization rotation is provided by a half-wave plate inside the cavity, for a planar ring oscillator, or by the non-planar optical path of a non-planar ring oscillator. Preferably, the pumping means is two laser diode bars adjacent to the gain medium, each of which has a power output of at least 10 W, and the laser has a power output of at least 3 W.

In an alternate embodiment, the optical resonator is an optical parametric oscillator (OPO) and the gain medium is a nonlinear crystal. The same design is used to eliminate mode hops in the OPO.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

The present invention provides a mode-hope-free tunable single-frequency optical resonator, and in particular, a solid state laser. The mode-hop-free nature of the laser is provided by a passive system and does not require active feedback control during laser operation.

Figure 1:
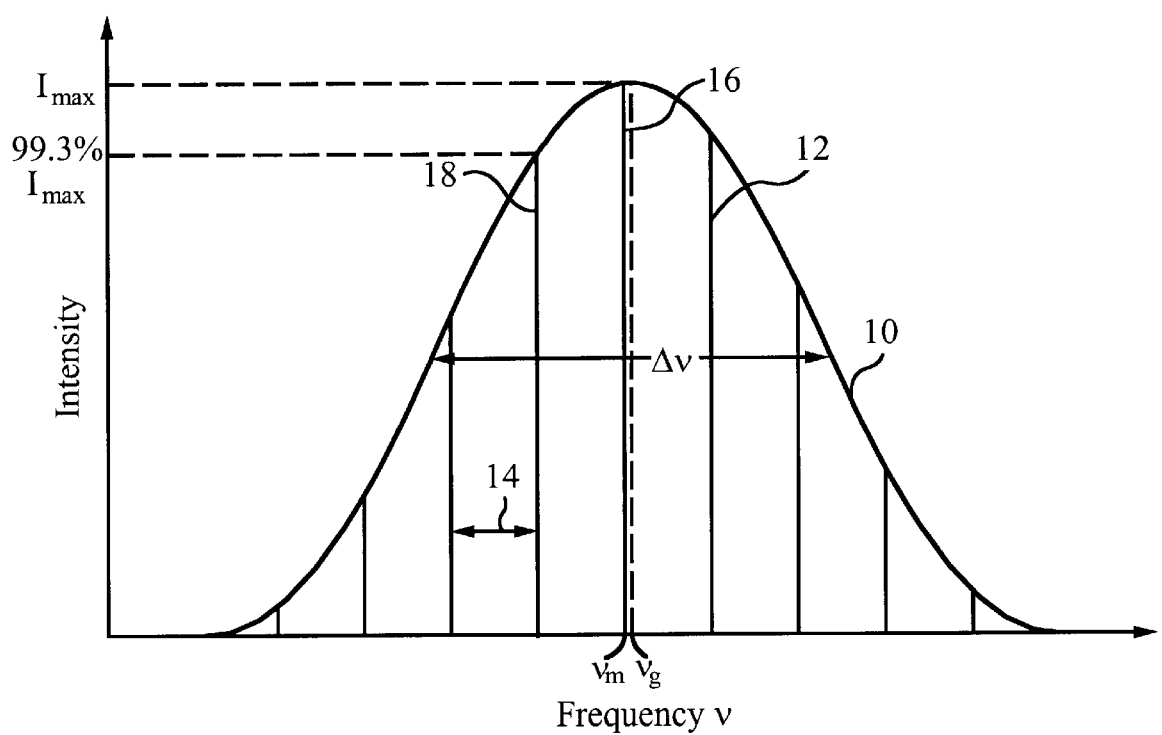
FIG. 1 is a gain curve of a laser gain material showing allowed axial modes.

Solid state gain materials emit light at particular wavelengths corresponding to atomic energy level transitions. Nd:YAG is a typical solid state lasant, with primary emissions at 1.064 $\mu$m and 1.319 $\mu$m. FIG. 1 illustrates a typical gain curve 10 for a Nd:YAG crystal at a wavelength of 1.064 $\mu$m, a frequency of about 2.818×10$^5$ GHz. The intensity of laser emission is plotted as a function of frequency. Curve 10 displays a Lorentzian distribution, expressed as I=I max$\{(\Delta\upsilon/2)^2/[(\upsilon_g-\upsilon)^2+(\Delta\upsilon/2)^2]\}$ with a peak gain $\upsilon_g$ and a full-width at half maximum $\Delta\upsilon$. The laser operates only at particular frequencies, or modes, within the gain envelope. Modes 12, shown as straight lines, are defined by the laser cavity: only an integral number of wavelengths are allowed in the round-trip path. Modes 12 are separated by a distance 14, known as the free spectral range (FSR). FSR 14 is inversely proportional to the cavity length. The allowed modes are further limited by the shape of gain envelope 10. Mode 16 is closest to the peak gain frequency $\upsilon_g$, and is therefore the optimal frequency for laser operation. If the gain at a particular mode is too low, the laser cannot operate at that mode. For Nd:YAG at 1.064 $\mu$m, $\Delta\upsilon$ is approximately 120 GHz. For an FSR 14 of 5 GHz, a mode 18 adjacent to mode 16 at the peak gain has 99.3% of the maximum gain. This gain reduction of 0.7% is enough that the laser will not lase at this frequency. Obviously, when there are more modes under the gain envelope, the modes are closer together, and it is more difficult to keep the laser operating at a particular mode. A large free spectral range 14, occurring in a smaller cavity, is therefore desirable for stable laser operation.

Figure 2:
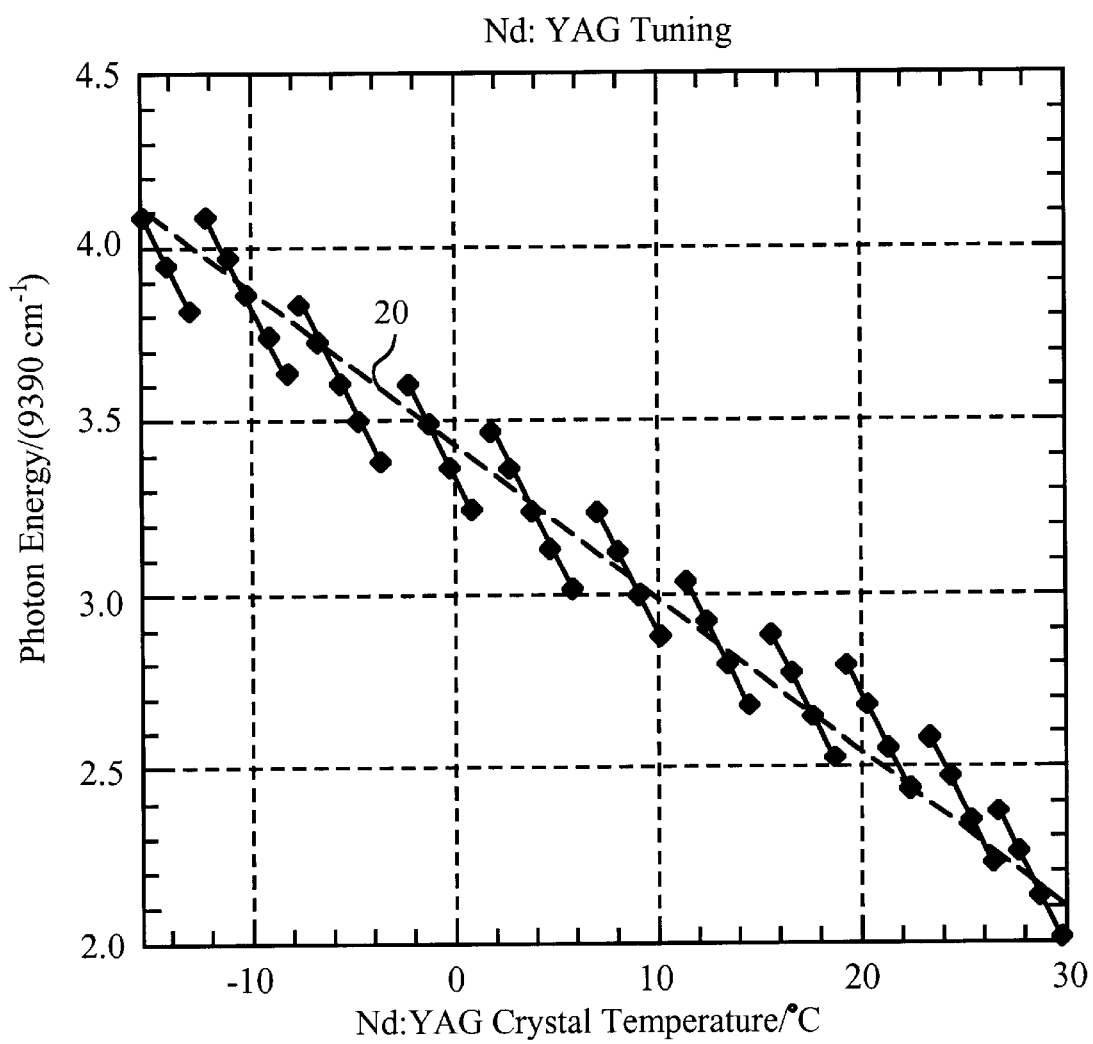
FIG. 2 is a graph of photon energy versus crystal temperature for a monolithic Nd:YAG laser with a 20 mm path length.

FIG. 2 is a graph of photon energy (1/$\lambda$ or $\upsilon$/c, where c is the speed of light) in wavenumbers (cm$^{-1}$) versus crystal temperature for a monolithic Nd:YAG laser with a 20 mm path length. A monolithic laser has a resonant cavity whose size is defined by the crystal itself. Ends of the crystal are polished or coated to act as mirrors and provide the necessary reflection and transmission. The overall slope of the curve, shown by dotted line 20, is the peak gain frequency tuning rate with temperature, $d\upsilon_g/dT$. This corresponds to the shift of the peak of curve 10 (FIG. 1) to decreasing frequencies as the temperature increases. For Nd:YAG at a wavelength of 1.064 $\mu$m, $d\upsilon_g/dT$=−1.3 GHz/° C.; at 1.319 $\mu$m, $d\upsilon_g/dT$=−1.0 GHz/° C. The shift in the peak gain with temperature is a physical property of the gain material. The piecewise slope of the discontinuous portions of the curve represents the axial mode tuning rate, $d\upsilon_m/dT$. The axial mode tuning rate, approximately −3 GHz/° C. for the monolithic laser shown, is more than double the peak gain tuning rate. As described above, the discontinuities in the curve correspond to the mode hops.

Most of the prior art teaches avoiding mode hops by confining laser operation to one of the line segments between adjacent discontinuities, or by adjusting the location of an external reflector to keep the cavity optical path length constant as temperature and gain medium optical path length change. In effect, this latter approach fixes the modes in place as the peak gain curve shifts. For a small region around the peak gain curve, the piecewise lines are horizontal—as long as the temperature fluctuates only slightly, laser operation remains fixed at a particular frequency.

In contrast to these known techniques, the present invention solves the problem (as evidenced by FIG. 3) by setting the axial mode tuning rate $d\upsilon_m/dT$ substantially equal to the peak gain tuning rate $d\upsilon_g/dT$. The tuning curve is then a continuous straight line 24. The cavity axial mode and the peak gain track each other automatically, and there is no tendency to mode hop as the crystal temperature changes. As used here, substantially equal means that the two tuning rates are close enough that the net separation between the peak gain and axial mode frequencies is less than one free spectral range over the desired or achievable tuning rate. Free spectral ranges for the lasers of the present invention are between 1 and 10 GHz, but may be as low as 100 MHz. If the laser is not deliberately tuned, and is operated at a fixed frequency and temperature, then the two tuning rates must be close enough that mode hops do not occur during environmental temperature fluctuations of 1° C. Therefore, $d\upsilon_m/dT$ and $d\upsilon g/dT$ are preferably within 100% of each other. The laser of the present invention may be tuned over 100 GHz, corresponding to a temperature range on the order of 100° C. Therefore, $d\upsilon_m/dT$ and $d\upsilon_g/dT$ are more preferably within 10% of each other, and most preferably within 1% of each other.

Tuning can occur over a wide range of temperatures and frequencies without mode hopping. The peak gain tuning rate is a physical property of the crystal and cannot be reliably altered. The present invention rather alters the axial mode tuning rate, a function of optical path length of the cavity. The axial mode tuning rate must be decreased, and therefore the cavity optical path length expansion rate must also be decreased. The cavity path length rate of change cannot be controlled for a monolithic resonator. However, a composite resonator combining materials having known thermal responses can be designed so that the axial mode tuning rate is identical to the peak gain tuning rate. This resonator is a combination of solid state gain medium, with characteristic thermal response, and free space, with no thermal response. The solution of the present invention applies to the case where the magnitude of the axial mode tuning rate of the monolithic laser, $|d\upsilon_m/dT|$, exceeds the magnitude of the peak gain tuning rate, $|d\upsilon_g/dT|$. This is generally not the case with semiconductor lasers, and therefore the present invention provides a solution that is significantly different from any proposed for eliminating mode hops in semiconductor lasers.

Figure 3:
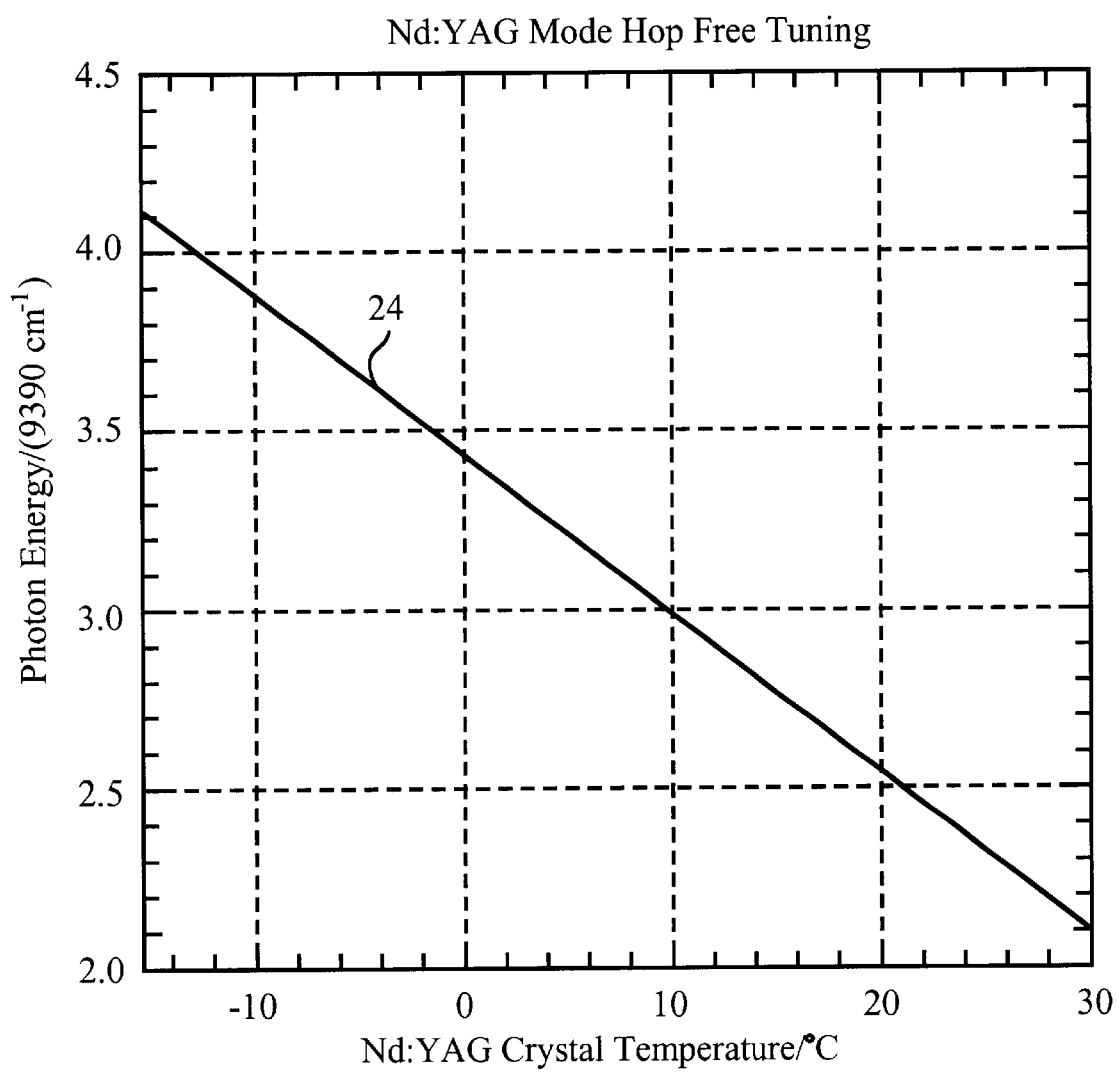
FIG. 3 is a hypothetical graph of photon energy versus crystal temperature for an Nd:YAG laser of the present invention in which mode hops are prevented.
Figure 4:
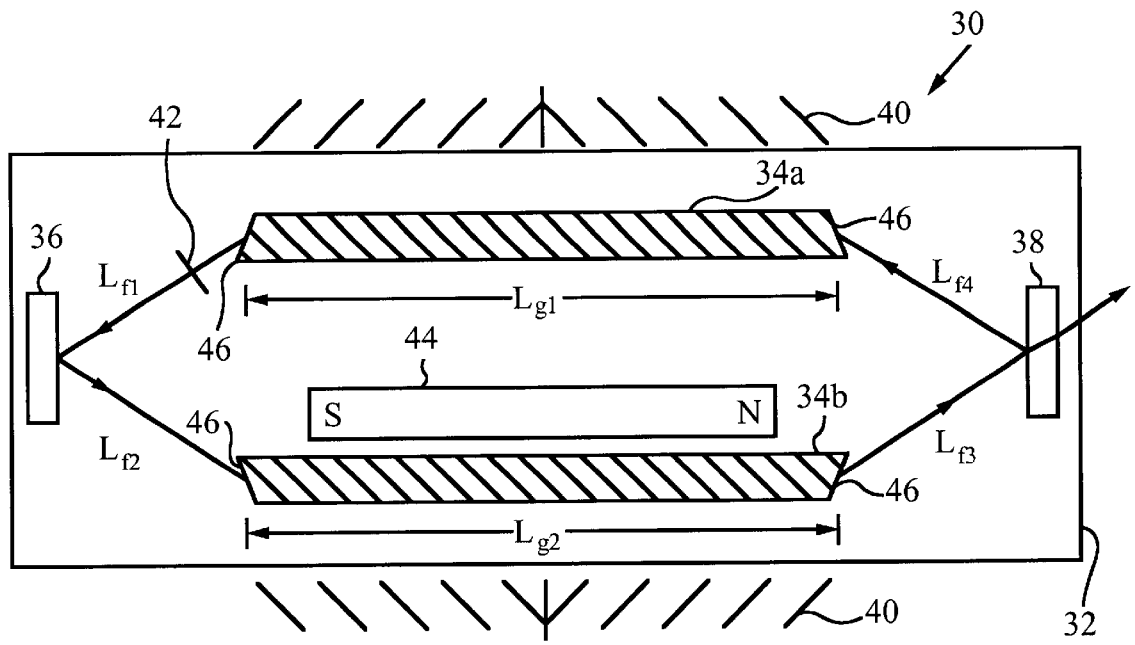
FIG. 4 is a top plan view of a mode-hop-free ring laser of the present invention.

This design can be understood by considering a preferred embodiment of the present invention, a planar ring laser shown in FIG. 4. Supported on substrate 32 are two rods of gain medium 34a and 34b, a high reflector 36, and an output coupler 38. As shown in FIG. 4, the laser light travels in a counterclockwise path. A portion of the. light exits through output coupler 38, which is partially transmissive to the lasing wavelength. In contrast, high reflector 36 is preferably completely reflective to the lasing wavelength. Starting from optical coupler 38, the light travels along the path with a distance $L_{f4}$ to gain medium 34a, through gain medium 34a for a distance of $L_{g1}$, out gain medium 34a to high reflector 36 along a path with distance $L_{f1}$, to gain medium 34b along a distance $L_{f2}$, through gain medium 34b a distance $L_{g2}$, and finally back to output coupler 38 along a path with distance $L_{f3}$. Of course, the light does not begin at output coupler 38; this is only a possible starting point for tracing the entire path traveled by the light beam. In one cycle, the light travels through the gain medium for a distance $L_g=L_{g1}+L_{g2}$ and through free space for a distance $L_f=L_{f1}+L_{f2}+L_{f3}+L_{f4}$. All of the lengths labeled on FIG. 3 are physical path lengths, not optical path lengths. The total physical distance traveled, the physical cavity path length, is given by $L_o=L_f+L_g$. The relevant quantity for determining the allowable axial modes is the optical cavity path length, $l_o=n_f L_f+n_g L_g$, where $n_f$ and $n_g$ are the refractive indices of the free space and the gain medium, respectively.

Substrate 32 is such that it has almost no response to a temperature change of gain medium 34. In particular, its linear expansion is less than 0.01% over the desired temperature range of gain medium 34, or over any temperature fluctuations in the surrounding environment. There are two embodiments of substrate 32 for accomplishing this purpose. In a preferred embodiment, substrate 32 is thermally insensitive. That is, substrate 32 has a negligible coefficient of thermal expansion, preferably less than 1 ppm/° C. Over the desired tuning range of 100° C., the length or width of substrate 32 changes by at most 0.01%, and can be considered constant as the temperature fluctuates in any region of laser 30. Various thermally insensitive materials are suitable for substrate 32, including Invar™, Super-Invar™, ULE™ (ultra-low expansion) Glass, Zerodur™, and fused silica. Of course, any other suitable material with coefficient of thermal expansion below 1 ppm/° C. may be used for substrate 32.

In the second embodiment, substrate 32 is thermally isolated, meaning that it is both thermally insulated from gain medium 34 and temperature-controlled to be at a constant temperature. In particular, the temperature is controlled to be within 1° C. of the desired constant temperature. In this embodiment, substrate 32 does not need to be of a material with a low coefficient of thermal expansion, because it is at a fixed temperature and therefore does not expand more than 0.01%, and preferably below 0.002%. For example, substrate 32 may be of aluminum, other metals, or any glasses.

The result of these choices for substrate 32 is that the physical cavity path length $L_o$ is temperature insensitive. In particular, the change in $L_o$ is so small that mode hops are prevented over a temperature range of 100° C. or over 100 GHz of frequency tuning when $L_o$ is considered constant in the equations below. Preferably, $L_o$ changes by at most 0.02% over the desired temperature range. The temperature insensitivity is defined by two factors: the placement of high reflector 36 and output coupler 38, which define the cavity path. length; and he ring geometry of the optical path, defined in part by the amount of expansion of rods 34. The definition of temperature insensitivity with respect to the first factor, placement of high reflector 36 and output coupler 38, is given above for substrate 32. With respect to the second factor, as gain medium 34 expands, the ring geometry changes slightly. This change in geometry introduces higher order terms into the expression for $L_o$. The higher order terms are at least one order of magnitude smaller than the change in length of rods 34. At most, this change is on the order of 1 ppm/° C., or 0.01% for the desired temperature range. Therefore, $L_o$ preferably changes by less than 0.02% and can be considered constant, implying that $L_f$ is given simply by $L_o$–$L_g$. The composite cavity of laser 30 consists of the gain medium, for which the relevant thermal response properties are known, and free space, with an effectively constant refractive index.. The combination of a fixed physical cavity path length and a free space with no thermal response allow for control of the axial mode tuning rate, simply by proper design of the cavity, as derived below.

The condition for eliminating mode hops is $$\frac{dv_m}{dT} = \frac{dv_g}{dT}. \tag{1}$$

It is necessary to derive an expression for $dv_m/dT$ as a function of known quantities. There must be either an integer (for a ring cavity) or half-integer (standing wave cavity) number k of wavelengths in the optical cavity path length, i.e.

$$\lambda_m = \frac{c}{v_m} = \frac{n_f L_f + n_g L_g}{k}, \tag{2}$$

where c is the speed of light. Then $$v_m = \frac{kc}{n_f L_f n_g L_g}, \tag{3}$$

and $$\frac{dv_m}{dT} = \frac{-kc\left(n_f \frac{dL_f}{dT} + L_f \frac{dn_f}{dT} + n_g \frac{dL_g}{dT} + L_g \frac{dn_g}{dT}\right)}{(n_f L_f + n_g L_g)^2} \tag{4}$$

The refractive index of the free space, $n_f$, is constant and equal to 1. As described above, $L_o$ is constant and $L_f$=$L_o$–$L_g$, so that equation (4) reduces to:

$$\frac{dv_m}{dT} = \frac{-kc\left((n_g - 1)\frac{dL_g}{dT} + L_g \frac{dn_g}{dT}\right)}{((n_g - 1)L_g + L_o)^2} \tag{5}$$

Using equation (2) and $L_f$=$L_o$–$L_g$ again, the final expression becomes $$\frac{dv_m}{dT} = \frac{-c}{\lambda_m} \frac{(n_g - 1)\frac{1}{L_g}\frac{dL_g}{dT} + \frac{dn_g}{dT}}{(n_g - 1) + L_o/L_g} \tag{6}$$

All of the quantities on the right-hand side are known. Setting equation (6) equal to $dv_g/dT$ and solving for $L_o/L_g$ yields $$\frac{L_o}{L_g} = 1 - n_g - v_m \left[\frac{(n_g - 1)\frac{1}{L_g}\frac{dL_g}{dT} + \frac{dn_g}{dT}}{\frac{dv_g}{dT}}\right]. \tag{7}$$

Equation (7) allows for proper design of laser 30 to ensure that axial mode tuning rate and peak gain tuning rate are the same. The two sides of equation (7) do not need to be identically equal to one other, but only substantially equal. In particular, they are preferably within 1% of each other, and more preferably within 0.1% of each other.

Values of $L_o/L_g$ can be determined for particular solid state gain materials 34, and the present invention can use almost any desired solid state gain material. As used here, and as commonly accepted in the art, the term solid state gain material refers to any doped crystal or glass capable of lasing. In particular, solid state gain materials used in the present invention must have properties such that $L_o/L_g$ derived from equation (7) is a physically realizable quantity. That is, $L_o/L_g$ must be positive and greater than 1. Allowable materials include, but are not limited to, Nd:YVO$_4$, Nd:YLiF$_4$ (also known as Nd:YLF), Tm:YAG, Tm: YLiF$_4$, Yb:YAG, Nd:glass, Ho: YLiF$_4$, and Er:glass. As is known in the art, the symbol X:Y refers to a crystal or glass of Y doped with X ions. YAG is a common abbreviation for yttrium aluminum garnet, which has the chemical formula Y$_3$Al$_5$O$_{12}$. Some of the listed materials lase at more than one wavelength, and the present invention is suited to both the dominant lasing wavelength and secondary wavelengths. For example, Nd:YAG emits at two particularly useful wavelengths, one at 1.064 µm, and one at 1.319 µm, each of which have different peak gain tuning rates. Any doping levels that produce sufficient lasing may be used.

Particular examples of $L_o/L_g$ can be determined for Nd:YAG, using the following quantities:

Refractive index $n_g$=1.82 at 1.064 µm

Thermal expansion coefficient 1/$L_g$ ($dL_g/dT$)=7.6 ppm/° C.

Thermo-optic coefficient $dn_g/dT$=7.3 ppm/° C. at 1064 nm

Peak gain tuning rate $dv_g/dT$=–1.3 GHz/° C. at λ=1.064 µm (υm=2.818×10$^5$ GHz)

Peak gain tuning rate $dv_g/dT$=–1.0 GHz/° C. at λ=1.319 µm (υm=2.273×10$^5$ GHz)

Substituting these quantities into equation (7) yields, for λ=1.064 µm, $L_o/L_g$=2.11 and, for λ=1.319 µm, $L_o/L_g$=2.25 (approximate value using refractive index and thermo-optic coefficient at 1.064 µm). Note that the thermo-optic coefficient is small enough that a constant value of refractive index can be used in equation (7) over the temperature ranges of interest. In particular, laser 30 can be scanned between –20° C. and 80° C. without mode hops, leading to mode-hop free tuning of an Nd:YAG laser over 130 GHz at 1.064 µm and 100 GHz at1.319µm.

Preferably, the free spectral range (FSR) (i.e. difference between two adjacent modes) is as large as possible to help prevent mode hops. Since the FSR is approximately equal to c/$l_o$, the cavity should be as small as possible. The minimum cavity size is limited only by the practicalities of assembling the components and the desired pump absorption efficiency. Higher order transverse modes are also more difficult to suppress as the cavity size decreases. Preferably, each of rods 34 is approximately ½ inch (1.3 cm) long, and the entire cavity is approximately 1 square inch (6.5 cm$^2$). Rods 34 are preferably cylindrical, in order to preferentially excite the fundamental TEM$_{00}$ mode, and have a diameter on the order of 1 mm, for example between 0.5 and 3.0 mm. The diameter may be varied according to the size of the fundamental transverse mode, and any diameter may be used. Of course, any other geometry of gain material may be used, including rectangular slabs or blocks.

One of the important: advantages of the present invention, especially when compared with the prior, techniques for avoiding mode hops in semiconductor lasers, is that it does not require a uniform cavity temperature in order to prevent mode hops. Solid state gain materials generate significant waste heat, in the range of Watts to tens of Watts. Especially in the composite cavity of laser 30, this waste heat is localized to rods 34, and it is very difficult to keep the cavity at a uniform temperature throughout in particular, waste heat is confined to a region substantially near rods 34, preferably within 1 mm from rods 34. The waste heat is also not generated or distributed uniformly in rods 34. The cavity physical path length has been designed so that average fluctuations cannot cause mode hops. Note that while temperature-insensitive materials are used as laser supports in the prior art, this is usually for thermal stability. In the present invention, the support does not provide thermal stability, because heat generation and temperature fluctuations are primarily caused by the gain material itself. Rather, the substrate fixes the cavity length and allows for a known axial mode tuning rate.

Also shown in FIG. 4 is pumping light 40. Preferably, pumping light 40 is from laser diode bars positioned along rods 34. Diode bars are high-power semiconductor devices, typically composed of GaAs, GaAlAs, and InGaAs and emitting light with wavelengths near 800 nm, that emit a line of light about 1 cm long and 1 $\mu$m in thickness. The configuration of FIG. 4 is referred to as "side pumped," because the pumping light enters rods 34 through the sides. This is distinct from end pumping, in which the pumping light enters through the ends of rods 34. Side pumping is preferable to end pumping in the present invention because it helps to promote uniform pumping and keep the gain curve sharp. End pumping causes a temperature difference between the pump entrance face and the 1/e absorption depth, sometimes as much as 10° C. or more, leading to a gain curve broadening of 10–15 GHz. Side pumping, in contrast, causes a uniform temperature along the entire length of rods 34 and helps to keep the gain curve narrow. It is important for the present invention that the rods be maintained at as uniform a temperature as possible. Temperature fluctuations within the remainder of the cavity, however, have no effect on either the axial modes or the gain peak, and these temperature fluctuations do not need to be controlled. As is known in the art, there are many other differences between side pumping and end pumping, and they will not be discussed here.

In particular, pumping preferably, but not necessarily, follows the side pumping architecture known as Direct Coupled Pump (DCP™), developed by Lightwave Electronics Corporation of Mountain View, Calif., and described in U.S. Pat. Nos. 5,774,488, issued to Kmetec, and 5,867,324, issued to Kmetec et al., both of which are herein incorporated by reference. In brief, rods 34 are encased in reflective chambers, preferably of gold-plated copper, which provide both thermal contact for the rods 34 and also an "integrating cylinder" for pump light 40. Pump light from the high-power diode bars is directly incident on a small slit in the side of the cylinder. Using DCP™, the conversion efficiency to round, polarized TEM$_{00}$ output is generally greater than 30%. In FIG. 4, pump light 40 is preferably provided by two 30 W diode bars, which preferably produce 15 W of output power.

Laser 30 includes two other elements, a half waveplate 42 and a magnet 44, used to obtain unidirectional lasing and to aid in frequency selection. Unidirectional lasing is forced by incorporating an optical diode into the cavity. Non-reciprocal polarization rotation and reciprocal polarization rotation are combined with a polarization-dependent loss to ensure unidirectional lasing. The non-reciprocal polarization rotates the plane of polarization for both directions of light travel in the cavity. The reciprocal rotation compensates for this rotation in one direction, and increases the rotation for the opposite direction. The two directions therefore have different enough polarizations that one can easily be selected for. The polarization-dependent loss causes a higher intracavity loss for one of the two directions. For laser 30, half wave plate 42 acts as the reciprocal polarizer. Rods 34 have anti-parallel Brewster-angle facets 46 on both ends to provide a perfectly transmissive window for one of the polarizations and induce a significant loss for the other, thereby selecting only one direction of lasing. Under a large magnetic field caused by magnet 44, the crystal itself acts as a Faraday rotator to cause non-reciprocal rotation. Nd:YAG is a moderate Faraday rotator. Commercially available magnets may be used to create a 0.03% loss discrimination, which is sufficient to ensure unidirectional rotation. Note that none of the additional elements in the laser cavity influence the axial mode at which the laser oscillates, and therefore their exact position and temperature are irrelevant to the present invention.

In an alternate embodiment of the present invention, the laser is a non-planar ring oscillator (NPRO). Design of a NPRO according to the present invention is nearly identical to that of laser 30. In a NPRO, the polarization state rotates a fixed amount, determined by the geometry, with each round trip of travel. The non-planar path itself, therefore, supplies the reciprocal polarization rotation, and half-wave plate 42 is not needed. Non-reciprocal polarization rotation is still required, and may be supplied by the Faraday response of the gain material in the presence of a strong magnetic field.

Figure 5:
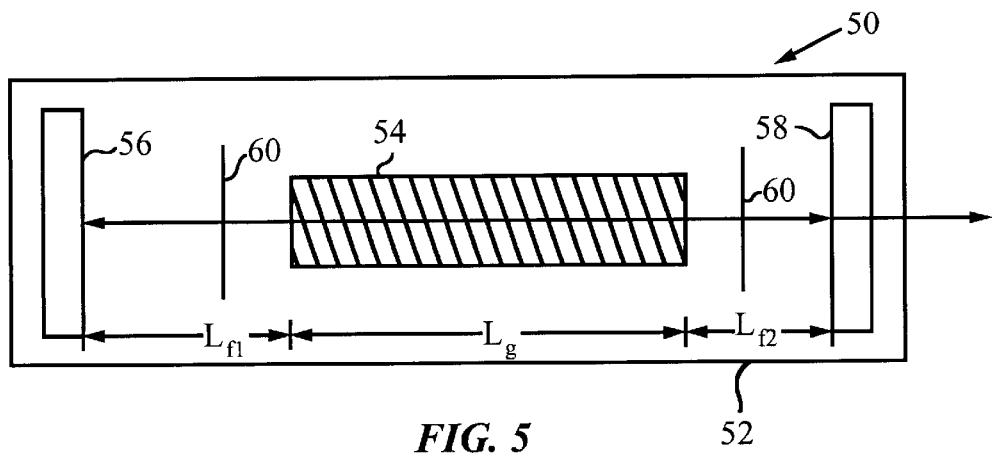
FIG. 5 is a top plan view of a mode-hop-free standing wave laser of the present invention.

An alternate embodiment, a standing wave laser 50, is illustrated in FIG. 5. Laser 50 is not the preferred embodiment, but serves to illustrate that the present invention may be applied to any type of laser to prevent mode hopping. Laser 50 contains a substrate 52, a solid state gain medium 54, a high reflector 56, and an output coupler 58. Also located within the cavity of laser 50 are two quarter-wave plates 60. Quarter-wave plates 60 are combined with other elements to induce circular polarization and eliminate spatial hole burning, as is known in the art. Any other suitable means for reducing or eliminating spatial hole burning may be used. Substrate 52 may be either of the two embodiments described above, so that the locations of output coupler 58 and high reflector 56 are fixed. In the case of laser 50, $L_o = L_{f1} + L_{f2} + L_g$. Equation (7) derived above is also used to find the ratio of $L_o$ to $L_g$ that prevents mode hops in laser 50.

The key concept of the present invention, matching of the axial mode tuning rate to the peak gain tuning rate, combined with its implementation using a fixed physical cavity path length, thermally insensitive substrate, and predetermined cavity element length ratios, can be applied to any laser as known in the prior art. Other features of the lasers of the present invention are not described explicitly, but are well known to those skilled in the art. For example, in addition to a wavelength at 1.319 $\mu$m, Nd:YAG also lases at 1.338 $\mu$m, a frequency that must generally be suppressed. Appropriate discrimination between the two frequencies can be achieved by coating high reflector 36 and output coupler 38 so that sufficient loss is provided for the undesired wavelength. Such coatings are well known in the art. Proper selection of the diameter of rods 34, as well as other details of the cavity, depends on the transverse mode size of the desired wavelength. These techniques are also known in the prior art, especially for lasants such as Nd:YAG, which is one of the most common solid state lasing materials. Furthermore, the laser cavity may also include any of the common intracavity elements, such as electro-optic or acousto-optic Q-switches, prisms, polarizers, etc.

Figure 6:
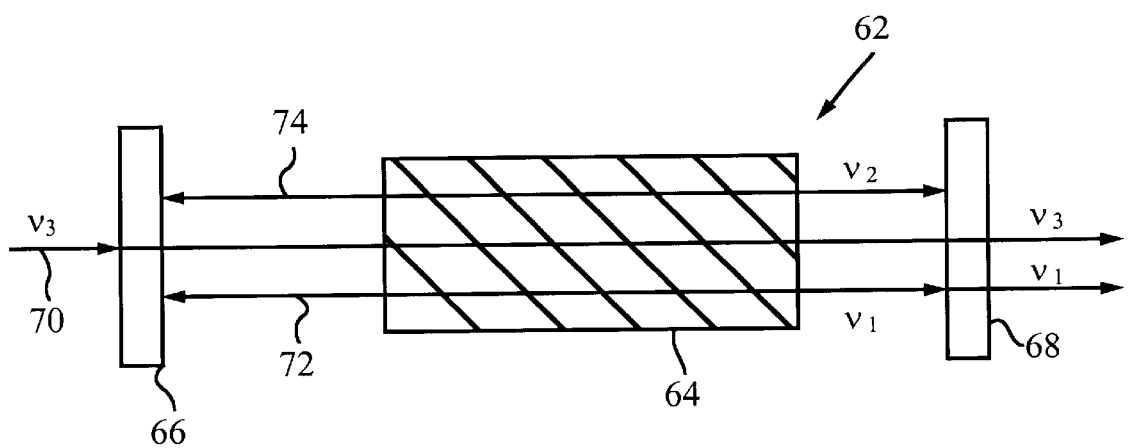
FIG. 6 is a top plan view of a mode-hop-free optical parametric oscillator of the present invention.

The concepts of the present invention may also be applied to an optical parametric oscillator (OPO) 62, shown in FIG. 6. A pump beam 70 at $\upsilon_3$ is passed through a nonlinear crystal 64 to generate a phase-matched signal beam 72 at $\upsilon_1$ and an idler beam 74 at $\upsilon_2$. Frequencies of the generated beams are determined by the crystal orientation and temperature. Mirrors 66 and 68 are transparent to pump beam 70. Mirror 66 is reflective to signal beam 72 and idler beam 74, and mirror 68 is partially transparent to signal beam 72. Beam 72 resonates within OPO 62, and the resonance frequency is determined by the cavity dimensions as for the lasers described above. The useful output of the OPO is a beam at $\upsilon_1$ that can be tuned as desired. OPO 62 has a problem of mode hops that is completely analogous to that of lasers 30 and 54 discussed above. Construction of the cavity using equation (7) can provide an OPO in which the cavity frequency tunes with the phase-matching peak, avoiding mode hops as crystal 64 is thermally tuned. Similarly, the present invention can be used for harmonic generation to keep the phase-matching peak aligned with the cavity resonance.

It will be clear to one skilled in the art that the above embodiments may be altered in many ways without departing from the scope of the invention. Accordingly, the scope of the invention should be determined by the following claims and their legal equivalents.

What is claimed is:

1. An optical resonator comprising:
   a gain medium for generating light of a characteristic frequency spectrum with a peak gain frequency $\upsilon_g$ and a peak gain frequency tuning, rate with respect to temperature $d\upsilon_g/dT$, said gain medium defining a physical gain, path length $L_g$ and having a refractive index $n_g$, a thermo-optic coefficient $dn_g/dT$, and a thermal expansion coefficient $(1/L_g) dL_g/dT$, wherein T is temperature of said gain medium;
   a thermally insensitive substrate for supporting said gain medium, said substrate having a negligible thermal expansion coefficient;
   a high reflector mounted on said substrate; and
   an optical coupler mounted on said substrate, said high reflector and said optical coupler defining a resonant cavity surrounding said gain medium, said cavity having a temperature-insensitive physical cavity path length $L_o$ and supporting resonance of said light at a plurality of axial mode frequencies, said cavity operating at a particular axial mode frequency $\upsilon_m$ closest to $\upsilon_g$ and having an axial mode tuning rate $d\upsilon_m/dT$, wherein $|d\upsilon_m/dT|>|d\upsilon_g/dT|$ when $L_o=L_g$, and wherein $L_o/L_g$ is chosen so that $d\upsilon_m/dT$ is substantially equal to $d\upsilon_g/dT$, whereby axial mode frequency tuning occurs without axial mode hopping.

2. The optical resonator of claim 1 wherein $$\frac{L_o}{L_g}$$

is substantially equal to $$1 - n_g - v_m \left[ \frac{(n_g-1)\frac{1}{L_g}\frac{dL_g}{dT} + \frac{dn_g}{dT}}{\frac{dv_g}{dT}} \right].$$

3. The optical resonator of claim 1 wherein said thermally insensitive substrate is chosen from the group consisting of Invar™, Super-Invar™, ULE™ Glass, Zerodur™, and fused silica.

4. The optical resonator of claim 1 wherein said gain medium is a solid state gain medium and said optical resonator is a laser.

5. The laser of claim 4 wherein said gain medium generates waste heat at a rate of greater than 1 W, and wherein dissipation of said waste heat is confined to a region substantially near said gain medium.

6. The laser of claim 4 wherein said gain medium is Nd:YAG, said peak gain frequency $\upsilon_g=2.818\times10^5$ GHz, said peak gain frequency tuning rate $d\upsilon_g/dT=-1.3$ GHz/° C., and $L_o/L_g=2.11$.

7. The laser of claim 4 wherein said gain medium is Nd:YAG, said peak gain frequency $\upsilon_g=2.273\times10^5$ GHz, said peak gain frequency tuning rate $d\upsilon_g/dT=-1.0$ GHz/° C., and $L_o/L_g=2.25$.

8. The laser of claim 4 wherein said gain medium is chosen from the group consisting of Nd:YVO$_4$, Nd:YLiF$_4$, Tm:YAG, Tm: YLiF$_4$, Yb:YAG, Nd:glass, Ho: YLiF$_4$, and Er:glass.

9. The laser of claim 4 wherein said gain medium comprises two cylindrical rods, each of said rods having a first Brewster face and a second Brewster face antiparallel to said first Brewster face.

10. The laser of claim 4 wherein said laser is a standing wave laser, further comprising means for ensuring single-frequency operation.

11. The laser of claim 4 wherein said laser is a ring oscillator, further comprising means for ensuring unidirectional lasing.

12. The laser of claim 11 wherein said means for ensuring unidirectional lasing comprises a magnet adjacent to said gain medium and a half-wave plate inside said cavity.

13. The laser of claim 11 wherein said laser is a non-planar ring oscillator, and wherein said means for ensuring unidirectional lasing comprises a magnet adjacent to said gain medium and a non-planar optical path.

14. The laser of claim 4, further comprising a pumping means for pumping said gain medium.

15. The laser of claim 14 wherein said pumping means comprises two diodes adjacent said gain medium, and wherein each of said diodes has a power output of at least 10 W and said laser has a power output of at least 3 W.

16. The optical resonator of claim 1 wherein said gain medium is a nonlinear crystal and said optical resonator is an optical parametric oscillator.

17. An optical resonator comprising:
    a gain medium for generating light of a characteristic frequency spectrum with a peak gain frequency $\upsilon_g$ and a peak gain frequency tuning rate with respect to temperature $d\upsilon_g/dT$, said gain medium defining a physical gain path length $L_g$ and having a refractive index $n_g$, a thermo-optic coefficient $dn_g/dT$, and a thermal expansion coefficient $(1/L_g) dL_g/dT$, wherein T is temperature of said gain medium;
    a thermally insensitive substrate for supporting said gain medium, said substrate having a negligible thermal expansion coefficient;
    a high reflector mounted on said substrate; and
    an optical coupler mounted on said substrate, said high reflector and said optical coupler defining a resonant cavity surrounding said gain medium, said cavity having a temperature-insensitive physical cavity path length $L_o$ and supporting resonance of said light at a plurality of axial mode frequencies, said cavity operating at a particular axial mode frequency $\upsilon_m$ closest to $\upsilon_g$ and having an axial mode tuning rate $d\upsilon_m/dT$, wherein $|d\upsilon_m/dT|>|d\upsilon_g/dT|$ when $L_o=L_g$, and wherein $L_o/L_g$ is chosen so that $d\upsilon_m/dT$ is substantially equal to $d\upsilon_g/dT$, whereby axial mode frequency tuning occurs without axial mode hopping.

18. The optical resonator of claim 17 wherein said thermally isolated substrate comprises:

a substrate material;

means for maintaining said substrate material at a constant temperature; and means for thermally insulating said substrate material from said gain medium.

19. The optical resonator of claim 17 wherein $$\frac{L_o}{L_g}$$

is substantially equal to $$1 - n_g - v_m \left[ \frac{(n_g - 1)\frac{1}{L_g}\frac{dL_g}{dT} + \frac{dn_g}{dT}}{\frac{d v_g}{dT}} \right].$$

20. The optical resonator of claim 17 wherein said gain medium is a solid state gain medium and said optical resonator is a laser.

21. The laser of claim 20 wherein said gain medium generates waste heat at a rate of greater than 1 W, and wherein dissipation of said waste heat is confined to a region substantially near said gain medium.

22. The laser of claim 20 wherein said gain medium is Nd:YAG, said peak gain frequency $\upsilon_g=2.818\times10^5$ GHz, said peak gain frequency tuning rate $d\upsilon_g/dT=-1.3$ GHz/° C., and $L_o/L_g=2.11$.

23. The laser of claim 20 wherein said gain medium is Nd:YAG, said peak gain frequency $\upsilon_g=2.273\times10^5$ GHz, said peak gain frequency tuning rate $d\upsilon_g/dT=-1.0$ GHz/° C., and $L_o/L_g=2.25$.

24. The laser of claim 20 wherein said gain medium is chosen from the group consisting of Nd:YVO$_4$, Nd:YLiF$_4$, Tm:YAG, Tm: YLiF$_4$, Yb:YAG, Nd:glass, Ho: YLiF$_4$, and Er:glass.

25. The laser of claim 20 wherein said gain medium comprises two cylindrical rods, each of said rods having a first Brewster face and a second Brewster face antiparallel to said first Brewster face.

26. The laser of claim 20 wherein said laser is a standing wave laser, further comprising means for ensuring single-frequency operation.

27. The laser of claim 20 wherein said laser is a ring oscillator, further comprising means for ensuring unidirectional lasing.

28. The laser of claim 27 wherein said means for ensuring unidirectional lasing comprises a magnet adjacent to said gain medium and a half-wave plate inside said cavity.

29. The laser of claim 27 wherein said laser is a non-planar ring oscillator, and wherein said means for ensuring unidirectional lasing comprises a magnet adjacent to said gain medium and a non-planar optical path.

30. The laser of claim 20, further comprising a pumping means for pumping said gain medium.

31. The laser of claim 30 wherein said pumping means comprises two diodes adjacent to said gain medium, and wherein each of said diodes has a power output of at least 10 W and said laser has a power output of at least 3 W.

32. The optical resonator of claim 17 wherein said gain medium is a nonlinear crystal and said optical resonator is an optical parametric oscillator.

* * * * *

UNITED STATES PATENT AND TRADEMARK OFFICE
CERTIFICATE OF CORRECTION

PATENT NO. : 6,614,818 B1
DATED : September 2, 2003
INVENTOR(S) : Jeffrey D. Kmetec et al.

It is certified that error appears in the above-identified patent and that said Letters Patent is hereby corrected as shown below:

<u>Column 1,</u>
Line 11, please insert the following paragraph before BACKGROUND ART
-- STATEMENT REGARDING FEDERALLY SPONSORED RESEARCHED OR DEVELOPED
This invention was made with Government support under contract F2901-99-C-0136 awarded by the United States Air Force. The government has certain rights in the inventions. --

Signed and Sealed this

Fourth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,614,818 B1
DATED : September 2, 2003
INVENTOR(S) : Jeffrey D. Kmetec et al.

It is certified that error appears in the above-identified patent and that said Letters Patent is hereby corrected as shown below:

Column 1,
Line 5, please insert the following paragraph before "FIELD OF THE INVENTION"
-- STATEMENT REGARDING FEDERALLY SPONSORED RESEARCH OR DEVELOPMENT
This invention was made with Government support under contract number F29601-99-C-0136 awarded by the United States Air Force. The government has certain rights in the invention. --

Signed and Sealed this

Ninth Day of August, 2005

JON W. DUDAS
*Director of the United States Patent and Trademark Office*